(12) United States Patent
Mannix et al.

(10) Patent No.: US 9,508,082 B1
(45) Date of Patent: Nov. 29, 2016

(54) OFFLINE LOCATION-BASED CONSUMER METRICS USING ONLINE SIGNALS

(71) Applicant: Groupon, Inc., Chicago, IL (US)

(72) Inventors: Pete M Mannix, Bellevue, WA (US); Neil P. Crist, Snoqualmie, WA (US)

(73) Assignee: Groupon, Inc., Chicago, IL (US)

( * ) Notice: Subject to any disclaimer, the term of this patent is extended or adjusted under 35 U.S.C. 154(b) by 286 days.

(21) Appl. No.: 13/573,783

(22) Filed: Oct. 3, 2012

Related U.S. Application Data

(60) Provisional application No. 61/542,460, filed on Oct. 3, 2011.

(51) Int. Cl.
　　*G06Q 30/00*　　(2012.01)
　　*G06Q 30/02*　　(2012.01)
　　*G06F 17/30*　　(2006.01)

(52) U.S. Cl.
　　CPC ...... *G06Q 30/0201* (2013.01); *G06Q 30/0224* (2013.01); *G06Q 30/0251* (2013.01); *G06F 17/30* (2013.01)

(58) Field of Classification Search
　　None
　　See application file for complete search history.

(56) References Cited

U.S. PATENT DOCUMENTS

| | | | |
|---|---|---|---|
| 6,055,573 A * | 4/2000 | Gardenswartz et al. | 709/224 |
| 6,298,330 B1 * | 10/2001 | Gardenswartz et al. | 705/14.25 |
| 7,814,139 B2 * | 10/2010 | Singh et al. | 709/201 |
| 8,676,628 B2 * | 3/2014 | Martignoni | G06Q 30/02 705/7.29 |
| 8,725,597 B2 * | 5/2014 | Mauseth et al. | 705/28 |
| 2002/0004754 A1 * | 1/2002 | Gardenswartz et al. | 705/26 |
| 2002/0046105 A1 * | 4/2002 | Gardenswartz et al. | 705/14 |
| 2005/0222906 A1 * | 10/2005 | Chen | G06Q 30/02 705/14.41 |
| 2008/0183717 A1 * | 7/2008 | Singh et al. | 707/10 |
| 2008/0270209 A1 * | 10/2008 | Mauseth et al. | 705/7 |
| 2011/0087519 A1 * | 4/2011 | Fordyce et al. | 705/7.29 |
| 2011/0119126 A1 * | 5/2011 | Park et al. | 705/14.45 |
| 2011/0196741 A1 * | 8/2011 | Gupta et al. | 705/14.53 |
| 2012/0109709 A1 * | 5/2012 | Fordyce et al. | 705/7.29 |

OTHER PUBLICATIONS

Goel, S., Hofman, J. M., Lahaie, S., Pennock, D. M., & Watts, D. J. Predicting consumer behavior with Web search.*
You, Chuang-Wen, et al. "Using mobile phones to monitor shopping time at physical stores." IEEE Pervasive Computing 10.2 (2011): 37-43.*
Partridge, Kurt, and Bo Begole. "Activity-based advertising." Pervasive Advertising. Springer London, 2011. 83-101.*

* cited by examiner

*Primary Examiner* — Gurkanwaljit Singh
(74) *Attorney, Agent, or Firm* — Alston & Bird

(57) ABSTRACT

A business monitoring system is described herein that brings together the previously separate worlds of social media and offline secret shopper and similar programs. With the business monitoring system, owners of brands are able to monitor the local voice of the customer to detect local and regional trends in sentiment and activity, build benchmarks and goals for local storefronts, evaluate in-store operations and customer service trends, and measure the local impact of marketing and advertising initiatives. The system collects and analyzes signals from online sources, producing reports, analytics, benchmarks, and alerts regarding offline activity at the local/store-front level. The system normalizes the signals from various sources, analyzes the signals at the individual location level, aggregates the data across various dimensions, builds benchmarks for comparison, and fires triggers notifying appropriate people upon detecting a meaningful variance. Thus, the system provides a rich and timely set of information to business decision makers.

20 Claims, 7 Drawing Sheets

US 9,508,082 B1

OFFLINE LOCATION-BASED CONSUMER METRICS USING ONLINE SIGNALS

CROSS-REFERENCE TO RELATED APPLICATIONS

The present application claims the benefit of U.S. Provisional Patent Application No. 61/542,460, entitled "OFFLINE LOCATION-BASED CONSUMER METRICS USING ONLINE SIGNALS", and filed on Oct. 3, 2011, which is hereby incorporated by reference.

BACKGROUND

Metrics are very important to the operation of a business. Businesses use metrics to plan future expansion, assess customer interest in products, receive feedback about areas for improvement, and so forth. Metrics may include sales information (e.g., for specifics products and specific locations), customer opinions, product volume, inventory, and so on. Traditional brick and mortar businesses collect metrics through their own unique processes depending on how they track sales. For example, some accounting systems provide metrics, while some businesses may dedicate whole departments to gathering and tracking metrics-related information. Online businesses, such as e-commerce websites, benefit from an inherent collection of metrics. Because their visitors and sales occur electronically, a good trail of the consumer's behavior and actions is available.

Secret shoppers are hired by many stores with physical locations to test the customer experience at those locations. A secret shopper is a survey respondent paid to go to a store, shop there, and report to the company or a third party about various aspects of the shopping experience. Stores may test how locations are treating customers, how locations are complying with regulations, whether particular rare conditions (e.g., a peanut allergy at a restaurant) were handled appropriately by staff, and so on. Secret shoppers are very useful for location-specific analysis, but they may fail to capture the experience of every customer and customer type, and the process misses the types of places (typically online) where customers of a business share opinions today.

A recent study indicates that consumer brands with brick and mortar locations missed more than 70% of local customer feedback. This "local blind spot" is the direct result of the exploding consumer adoption of mobile, social, and location-based services. Many brands using leading social media and brand monitoring solutions do not realize they have this blind spot. The study found that keyword-based social media monitoring solutions, while an important piece of an overall strategy, failed to comprehensively surface in-store consumer content. For instance, keyword-based monitoring for Costco missed 63% of local consumer feedback at their warehouses. The root cause of the blind spot is that most solutions in the market today are designed for broad monitoring across the Internet, using keyword and key phrase matching. In addition, Internet-wide monitoring is not particularly good at sorting out specific information related to individual locations of a multi-location business.

DETAILED DESCRIPTION

Figure 1:
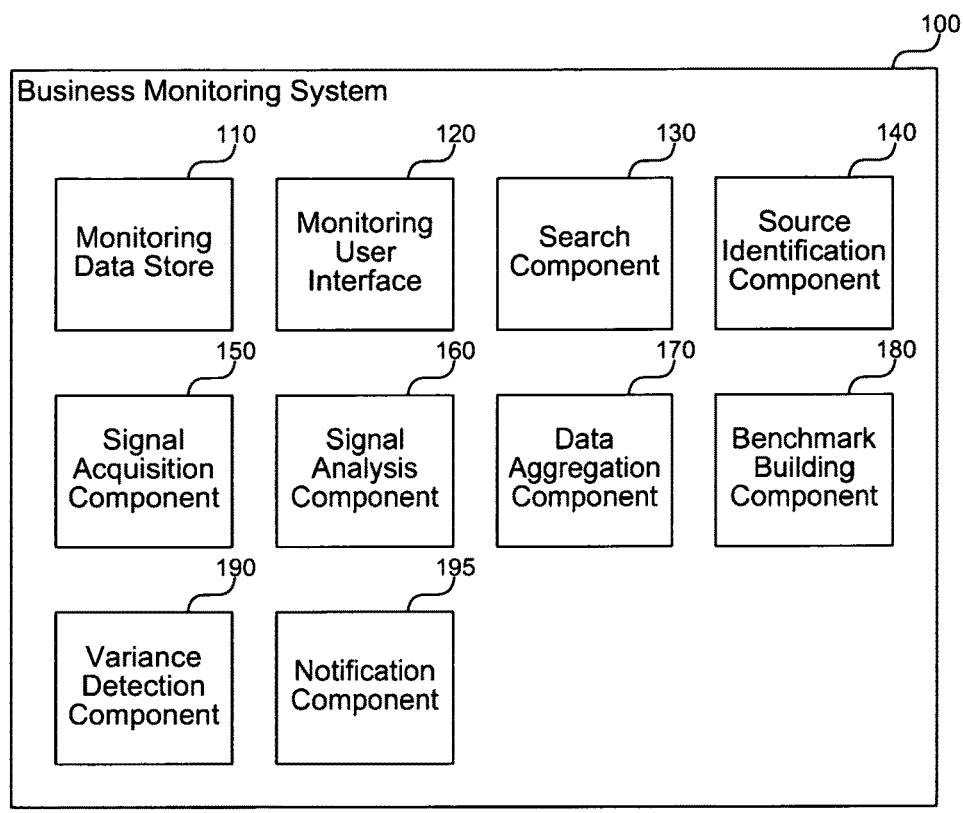
FIG. 1 is a block diagram that illustrates components of the business monitoring system, in one embodiment.

A business monitoring system is described herein that is based on a bottom up architecture, ensuring that local content explicitly tied to a brand location surfaces—regardless of a match to a pre-determined set of keywords. The system brings together the previously separate worlds of social media and offline secret shopper and similar programs. With the business monitoring system, owners of brands are able to monitor the local voice of the customer to detect local and regional trends in sentiment and activity, build benchmarks and goals for local storefronts, evaluate in-store operations and customer service trends, and measure the local impact of marketing and advertising initiatives. The system collects and analyzes signals from online sources, producing reports, analytics, benchmarks, and alerts regarding offline activity at the local/store-front level. The system normalizes the signals from various sources (reviews, check-ins, mentions, and so on), analyzes the signals at the individual location level, aggregates the data across various dimensions, builds benchmarks for comparison, and fires triggers notifying appropriate people upon detecting a meaningful variance. The resulting system produces alerts, trends, and analyses for offline/in-store location-based activity, using online signals. Comparisons between trends and analyses produced by the system have correlated meaningfully with offline verification. Thus, the business monitoring system provides a rich and timely set of information to business decision makers.

As used herein, location may refer to any specific venue or physical address, perhaps within a larger address (e.g., a storefront within a mall, or a concession stand at a baseball stadium). A site refers to an online website or service where people talk about offline activity (e.g., Facebook, Twitter, online forums, and so on). A source refers to a particular page or venue within a site talking about a particular location (e.g., "The White House's Facebook Place page"). A consumer or source member is a person who interacts with a source. A brand is a set of locations with some associated metadata. A signal is any content retrieved or recorded from a source, including check-ins, reviews, mentions, and the like. A signal also includes the change in consumer count (e.g., added/removed a fan/follower).

The information provided by the business monitoring system can be used for a wide variety of applications relevant to improving business operations. A few of these applications are provided in the following paragraphs by way of example, including monitoring effectiveness of online and offline marketing campaigns, detecting in-store operational problems, identifying storefront innovation, producing competitive intelligence, and inferring store groupings based on implicit customer profiles.

The first example described herein is using the business monitoring system to monitor the effectiveness of online and offline marketing campaigns. Staff can instruct the system to time-box a set of locations, producing an overall view of a marketing campaign, measuring the signals captured—reflecting both online and offline results. The view includes both overall change metrics (new people engaged with the tracked locations during the period, total amount of activity/signal data generated at the tracked locations during the period, and so on) and trends within the campaign (day by day or week by week performance within the locations tracked). An example is the measurement of the effectiveness of a new billboard advertisement placed near a store location (or in the same city, for example). The system gathers online signals and can compare the consumer sentiment towards the business before and after the billboard goes up. The changes measured are sufficiently granular and can be compared with changes at other locations (e.g., a control group) to determine an amount of change that can be inferred to result from the billboard. Thus, online signals provide data of the effectiveness of offline advertising.

The campaign can be compared both to historical and concurrent benchmarks. For instance, if the campaign tracks five locations for eight weeks, the system can compare the campaign to the metrics of those same five locations for the eight weeks prior to the campaign start, as well as to the metrics of the other locations within the brand during those same eight weeks. The system can weigh the concurrent benchmark comparison by location count to produce comparative metrics. If the five locations added 100 followers and the other 10 locations added 50 followers, the five locations generated four times more followers than the other locations (the five locations generated 20 followers per location, while the 10 generated only five per location), and this change can be appropriately correlated with the campaign.

Another example is using the business monitoring system to detect in-store operational problems. Notifications provide a way for the recipient to be informed when a set of locations begin generating an abnormally high number of complaints, and expose the trending topics and complaints themselves to the recipient. These notifications in turn often include specific customer feedback about staff, facilities, service, or other operational issues. The recipient of the notification can then work with the customer to resolve the complaint, and work with the locations involved to address the underlying operational problem. Other metrics may also contribute to a report of operational problems, such as a sales drop at one location compared to other comparable locations during the same period.

Another example is using the business monitoring system to identify storefront innovation. Through campaign tracking, notification, or interactive review, locations that are performing significantly better than other locations at certain metrics can be highlighted graphically. The person reviewing the highlighted performance can drill into the activity reflected in the metrics, and determine whether there are particular topics or messages that encouraged the improved customer behavior. Additionally, the person can reach out to the staff responsible for the particular improved locations to request detail as to what other efforts they have taken to improve the performance of their locations. This can assist in improving other locations.

The business monitoring system can also be used to produce competitive intelligence. The system can generate specific benchmarks for the locations of competitive brands, tracking their publicly available data. Those benchmarks can be used to compare the brand to its competitors on a brand-wide, segment by segment, or location basis, using the metrics tracked as part of the system.

The business monitoring system can also be used to infer store groupings based on implicit customer profiles. Each of the profiles that left the signals on the sources are collected and themselves analyzed, generating several quantitative dimensions. One dimension may include a number of interactions overall, grouped by type (check-in, review, mention, and so on), grouped by sentiment (positive vs. neutral vs. negative). Another dimension may include a number of interactions containing words from a series of word lists (e.g., a word list containing swears, another containing brand names or trademarks, and so on). There can exist standardized word lists used for all brands, as well as brand-specific word lists.

The resulting dimensions have a single number for the profile for each word list ("this person left feedback mentioning a brand name three times"), as well as series of numbers, one per word within each word list ("this person left feedback mentioning 'big mac' two times"). Another dimension is demographic data, either inferred or explicit—age range, gender, education level, and hometown. Another dimension is location data—quantifying the number of times the person interacted with an individual location, with a location in a town/city, with a location in a state/region. Another location is temporal data—quantifying how often the person interacts during the day vs. during the night, as well as weekday vs. weekend, and season. Other dimensions may include additional quantitative data extracted from the profile metadata and interaction history.

In some embodiments, the qualitative profile dimensions are fed into a sparse matrix and clustered with a vector clustering process, such as bisecting K-Means, producing 50+ clusters. The locations within the brand are then grouped according to how often profiles from each of the clusters interact with them. The resulting grouping of locations can then be used to target marketing campaigns (e.g., "people like *this* go to these locations, so run a targeted campaign there"), define custom location segments for benchmarking (e.g., "this location is performing significantly better [or worse] than other locations with similar customers").

FIG. 1 is a block diagram that illustrates components of the business monitoring system, in one embodiment. The system 100 includes a monitoring data store 110, monitoring user interface 120, search component 130, source identification component 140, signal acquisition component 150, signal analysis component 160, data aggregation component 170, benchmark building component 180, variance detection component 190, and notification component 195. Each of these components is described in further detail herein.

The monitoring data store 110 stores data collected and analyzed by the system 100 to build metrics for reporting to one or more report recipients. The report recipients may include the brand owners, competitors, service providers, or any other party interested in a business. The monitoring data store 110 may include one or more files, file systems, hard drives, databases, cloud-based storage services, or any other facility for storing data. From an interactive perspective, the data store 110 may be partitioned and queried independently on a brand basis. For benchmarking/non-interactive purposes, cross-brand queries are supported, though interactivity is not required. The monitoring data store 110 builds a historical log of data collected over time, so that comparisons can be made to detect relevant events and to suggest action changes or marketing improvements.

The monitoring data store 110 includes location data that provides a collection of geographic points ("locations"), grouped together into "brands", representing the locations to be tracked. The location data store also includes brand-specific categorization of each location (e.g., "store type" of "kiosk" vs. "store type" of "stand-alone"), and references to the sources from which each location can acquire local signal data. The monitoring data store 110 also contains data acquired from each signal. Data from each signal is retrieved and analyzed, with signal data stored by "source", which in turn is tied to zero or more "locations", and tied to one "brand". The content may include cached data and derived metadata to categorize the signal data.

The monitoring data store 110 also contains benchmark information. Brands and locations themselves have metadata tied to them—both implicitly defined (e.g., geographic, demographic, industry classification, brand/location type) and explicitly defined (e.g., brand-determined categorizations). Signal data is stored in aggregate according to the benchmark dimensions available, tied to a time component to track changes over time (e.g., to record the fact that coffee shops in Seattle had on average X new visitors in July 2011, or Y customer interactions on Aug. 3, 2011).

The monitoring user interface 120 receives input from report recipients to define the type of monitoring information to be tracked and outputs reports to report recipients that contain the requested monitoring information. The user interface 120 includes a facility to define locations and sources within a brand, specify triggers for alerting (to whom and when), and to query aggregate brand data interactively. The interface 120 may include a web interface with web-based forms, interactive maps and graphs, downloadable spreadsheets, and emails delivered to notify recipients of triggering activity. The interface may also include one or more mobile applications (e.g., for a smartphone or tablet), desktop applications, and a programmatic interface (e.g., a web service or object model) through which other services can leverage the power of the business monitoring system 100 to provide extended services.

The search component 130 provides query-based access to the monitoring data store 110 for answering business inquiries. In some embodiments, the data displayed is a set of rollup values stored in various databases, but for ad-hoc queries and content drill-down, the content is indexed in an inverted index system (e.g., Solr/Lucene), exposing a high performance query interface with faceting on location, source type, interaction type, sentiment, segment, and demographic data. The search component 130 allows business owners or others to extract data along any axis that interests them, and can provide answers to specific questions (e.g., what products are buyers near store X interested in, how effect of the advertisements placed in region Y, and so forth).

The source identification component 140 identifies signal sources relevant for a particular location and brand. In some embodiments, each location is coded with latitude and longitude, as well as the location's name (a local nickname, trade name, or the brand's name). For each location, each of the integrated source sites is queried to identify the source page for that location's signals. The manner of querying depends on the source site itself (e.g., through a Foursquare venue search application-programming interface (API), through a third party database such as Locationary or Factual, or through a third party search engine/index such as Google with site search filters).

In some embodiments, the system periodically tries to fill in gaps through crowdsourcing the source discovery. For example, the system may create Mechanical Turk Human Intelligence Tasks (HITs) that request that Mechanical Turk workers look at a search results page and pick the source associated with the business/location. These tasks may show the high-level criteria (location name, address, and site), display the search results page for that site's search, and then pay out a small amount (e.g., $0.04) to have the worker enter the correct source's uniform resource locator (URL). The system verifies sources by checking their general accuracy (e.g., are they for a supported site?). The system associates the sources with the location provided, with an implicitly determined location within the brand (e.g., by parsing address information from the source data), or with the brand as a whole. Clients/brands and support staff periodically review the sources found and their assignment to locations to provide another layer of validation. Sources can be trivially disabled or reassigned to another location, as needed.

The signal acquisition component 150 acquires new data from specified signal sources. A set of sites are identified and integrations developed for each, designed to acquire signals through the site's API or web interface while complying with appropriate terms of use and query limitations. Sites are selected as they increase in prominence for location-based consumer activity, and may include Foursquare, Gowalla, Facebook Places, Facebook, Twitter, Yelp, CitySearch, InsiderPages, Citygrid, Judysbook, Yahoo Local, Google Places, and others. Integrations use a site-provided API where available and appropriate, but may also use standard web scraping/crawling tools to parse available metadata. The component 150 queries sites for their sources periodically (e.g., daily). The query rate may vary based on the terms of service for the individual sites, performance, or other factors. When queried, various types of signals are acquired, such as total number of consumers who have interacted with the source, total number of interactions to date, content those consumers have shared, ratings or metadata associated with individual interactions, as well as metadata about the individual source and location itself.

The signal analysis component 160 analyzes data received from each source to identify brand and location relevant information. Each piece of content is analyzed for both structural and textual meaning, as well as for demographic metadata about the person who left the content. In some embodiments, content analysis is performed asynchronously whenever new data is acquired. Structural data includes the name of the person who left the signal, any picture associated with their profile, the date/time that the data was left, and any explicit scores or topics entered. Textual analysis may be performed using standard search engine technology (e.g., Lucene/Solr) to identify the topics and phrases within the data.

In some embodiments, semantic analysis is performed on the textual signal left, extracting both high-level mood estimates and additional normalized topics. Semantic analysis can be performed with standard off-the-shelf text analysis engines, such as OpenAmplify's web service, or via proprietary solutions. In some embodiments, demographic analysis is performed on the textual signal left as well, augmenting any explicitly provided demographic data about the author who left the content (e.g., age, gender, education level). When explicit demographic data is not available, implicit demographic data can be estimated using statistically derived text models, powered by models such as locally trained Bayesian classifiers or a web service such as uClassify.

The data aggregation component 170 aggregates data to discover trends and useful information across retrieved data points. On a periodic (e.g., day-by-day) basis, the component 170 compactly summarizes the state of individual sources into useful statistics, such as: total number of people that have followed or interacted with the source, total number of people that have a bidirectional relationship with the source, and total number of check-ins, reviews, and messages that have been left at the source. In some embodiments, the source summaries are aggregated into location summaries, combining the data in each location's sources into useful statistics by day (or other grouping), including: new messages, check-ins, and reviews added that day, number of new messages that are overall positive in nature, number of new messages that are overall negative in nature, number of new messages that are overall neutral in nature, total number of messages received, new followers added that day (unidirectional relationship), and new fans added that day (bidirectional relationship).

In some embodiments, the data aggregation component 170 then groups location aggregation by brand-defined dimensions, such as store type, state, region, and department. The locations associated with each of the segments in each dimension are rolled up into a segment summary with a few useful statistics by period. The rollup is an aggregation with each record showing data such as the total new fans on a particular day for all "kiosk" locations or the total number of new positive signals for all locations managed by a particular person.

The benchmark building component 180 builds relevant benchmarks for tracking brand information. Benchmarks are both intra-brand and system-wide. Intra-brand benchmarks are built from the historical trends of individual sources, locations, and segments. Inter-brand benchmarks are built by using the additional metadata tied to locations and brands to determine which locations and segments should be compared against each other (e.g., coffee shops to coffee shops, rural shops to rural shops instead of rural shops to urban shops, and so on). In some embodiments, intra-brand benchmarks are built implicitly by persisting and querying the aggregate analysis data.

In some embodiments, inter-brand benchmarks are built both explicitly and on an ad-hoc basis. They are built by using the location and brand metadata to define a particular type of benchmark (e.g., industry benchmark), the function to classify which locations belong in each category (e.g., Standard Industrial Classification (SIC)/North American Industry Classification System (NAICS) code), and then aggregating the underlying location summaries accordingly. Benchmarks can also be broken down with additional categorization (e.g., an industry plus population benchmark), which uses more complex classification functions (e.g., SIC/NAICS code plus Urban/Suburban/Rural).

In some embodiments, benchmarks are built according to actual values, as well as with derivative functions, such as percent growth per capita for the town/city the location is in, percent growth per online community member, and percent growth per source site community size (e.g., total number of Twitter users, total number of Foursquare users). Benchmarks may be persisted and queried in the same way that brands as a whole are, using dimensions and segments to store the aggregate data then snapshotted using summary data.

The variance detection component 190 detects defined occurrences in the data that indicate anomalies or other events of interest. Each brand can define a set of triggers, specifying who should be notified when certain attributes exceed the normal parameters. In some embodiments, triggers are defined within the brand at the individual location level, at the segment level, at the brand level, or at some combination thereof. Triggers can be defined to be evaluated on a daily, weekly, or other basis. When a trigger is due to be evaluated, the locations being covered are compared across the defined aspects to the appropriate benchmark, and if the data varies more than expected, the trigger is fired, producing a notification.

Triggers can be defined on any of the tracked metrics, such as people engaged with the store, positive or negative mentions, number of interactions or reviews, and so forth. Triggers can be tracked against the associated locations' historical trends as a benchmark (e.g., "did these stores have significantly more or less check-ins this week than they usually did over the last 6-12 months?"), or against another benchmark in the system (e.g., "did these stores have significantly more or less check-ins this week than other coffee shops had?"). Triggers may define the threshold for notification (e.g., ">5% above the average"), use the standard deviation as the implicit threshold (e.g., "it usually varies −5 to +5%, but if it varies by 8%, fire the trigger"), or apply other criteria.

The notification component 195 provides a notification based on detected events from the variance detection component 190. The notification component may use email, text messaging, push notifications to a mobile device, or any other facility for communicating with users configured to be notified when events occur. The notification component 195 may include information in the notification such as a textual description of the event that led to the notification, a severity of the event, and so forth. The notification component 195 may be configured to notify multiple people in relation to the same event (e.g., a store manager and district manager).

The computing device on which the business monitoring system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
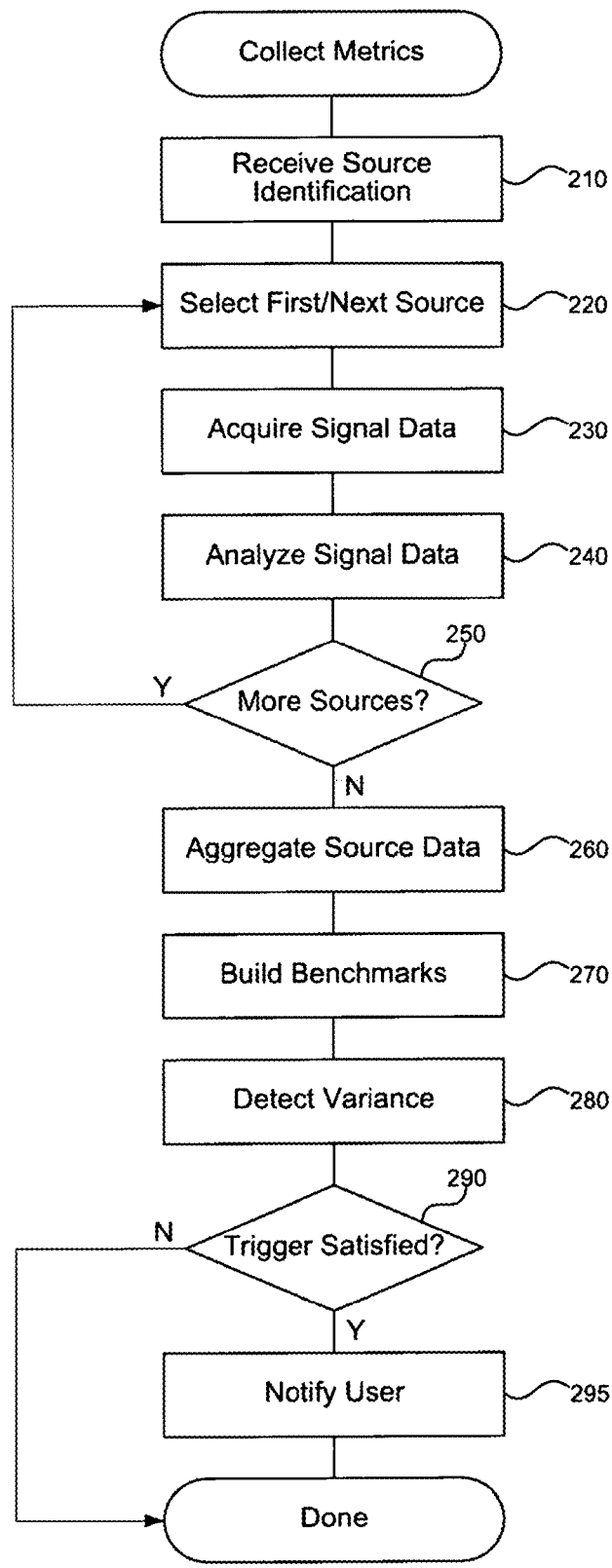
FIG. 2 is a flow diagram that illustrates processing of the business monitoring system to build metrics by tracking online occurrences and inferring offline behavior from those occurrences, in one embodiment.

FIG. 2 is a flow diagram that illustrates processing of the business monitoring system to build metrics by tracking online occurrences and inferring offline behavior from those occurrences, in one embodiment.

Beginning in block 210, the system receives a list of one or more sources that provide online signals relevant to a particular physical location and brand. The system may access the list of sources from a data store where the source list was stored after a brand owner or other person configured the system to track metrics for the physical location and brand. The sources may include a variety of online locations, specified by URL or other identifier, where consumers of the physical location and brand congregate online and discuss the business represented by the physical location and brand. For example, the sources may include social networks (e.g., Facebook, Google+, Twitter), online forums, location-based sites (e.g., Foursquare, Yelp), and so forth.

Continuing in block 220, the system selects a first source from the list of sources from which to collect updated signal data. On subsequent iterations, the system selects the next source in the list of sources until all sources have been processed. The system may perform this process on a periodic basis (e.g., daily) for each brand and physical location tracked. In some embodiments, the system may combine effort for gathering data from each source where a source contains data for multiple physical locations and/or brands. The system may also adhere to configured thresholds for acquiring data based on terms of use or other acceptable use policies of each source.

Continuing in block 230, the system acquires signal data from the selected source. The signal data may include user posts, user activities (e.g., likes, mentions), or other user activities, that provide information related to the users' opinions or experiences with respect to the physical location and/or brand. The system may acquire data by accessing programmatic APIs of each source, accessing an exposed web service, crawling a website and scraping data, or other data collection method. The system acquires the data and stores the data in a monitoring data store for analysis to derive metrics for the business.

Continuing in block 240, the system analyzes the acquired signal data to identify information related to the particular physical location and brand. The system may perform a variety of types of content, semantic, demographic, and other analysis to determine the content and nature of each acquired content item. Information analyzed may include an author of each content item, whether the content item is overall favorable or unfavorable, products mentioned in the content item, a message or sentiment conveyed by the content item, and so forth.

Continuing in decision block 250, if there are more sources in the list of sources, then the system loops to block 220 to select the next source. Although shown serially for ease of explanation, those of ordinary skill in the art will recognize that the system may process sources in parallel, acquiring signal data from each or from multiple sources at the same time for increased efficiency.

Continuing in block 260, the system aggregates signal data acquired from the sources to identify cross-source trends. The system rolls up data from each source to produce overall metrics for benchmarks such as number of total posts, number of positive mentions, number of negative mentions, change in statistics from a prior period (e.g., drop/rise in day-over-day opinion), and so forth. By looking at multiple sources, the system paints a more complete picture of how people congregating online view an offline, physical business location.

Continuing in block 270, the system builds one or more benchmarks that track brand information by comparing historical information to the acquired and aggregated signal data. The system determines comparable locations and segments to determine which historical data to compare. Comparisons may occur between locations of the same brand, between brands of similar types (e.g., coffee shops), and so on. The system may include a variety of explicitly and implicitly defined benchmarks. In some embodiments, the system implicitly builds benchmarks by identifying similar data across brands and locations and identifying past matching brands and/or locations as similar for comparison. Benchmarks may use acquired data directly as well as derivative data calculated upon the acquired data.

Continuing in block 280, the system detects one or more variances in the acquired and aggregated data compared with the historical information to determine whether one or more triggers have been met for notifying a user. A variance may include any deviation from an expected value for any tracked metrics, including both explicitly and implicitly defined variances. Customers of the system may define their own trigger points at which to be notified, and the system may define default trigger points based on historical information and observing values that are out of character or represent a significant change.

Continuing in decision block 290, if the system detects that a trigger condition has been met, then the system continues at block 295, else the system completes. Whether the system notifies a user or not, the processing to detect variances, build benchmarks, aggregate data, and acquire signals is stored in a data store so that the resulting data can be compared with that of subsequent and later periods.

Continuing in block 295, the system notifies a user that at least one metric satisfies a trigger. The notification may include any type of communication, such as a text message, instant message, email, phone call, push notification, or other communication. The notification may be addressed to any user that has set up notifications, such as a manager of a retail location, a competitor, or others. The notification allows the recipient user to act upon the information, either by changing marketing or taking other actions (e.g., increasing employee training, offering a new product, and so forth). After block 295, these steps conclude.

Figure 3:
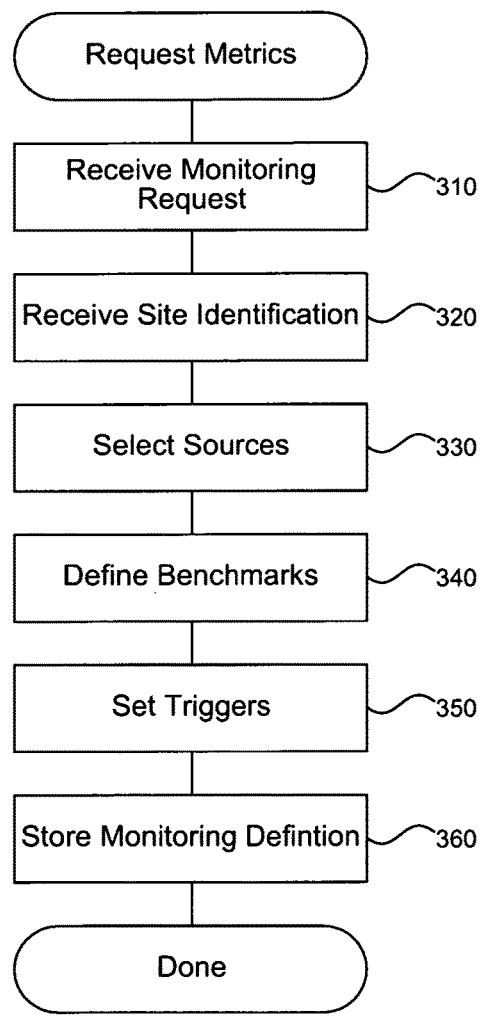
FIG. 3 is a flow diagram that illustrates processing of the business monitoring system to receive a request to monitor a brand's performance at a physical location through online events, in one embodiment.

FIG. 3 is a flow diagram that illustrates processing of the business monitoring system to receive a request to monitor a brand's performance at a physical location through online events, in one embodiment.

Beginning in block 310, the system receives a monitoring request from a requesting user, wherein the monitoring request specifies one or more brands and physical locations for which to monitor online activity to infer offline behavior. The system may receive the request through a web-based user interface that brand owners, competitors, service providers, or other users access to submit requests for particular data from the system. The system may collect additional information and create a stored user profile for the requesting users so that the requesting user can access the site on an ongoing basis to receive reports and other forms of brand metric output.

Continuing in block 320, the system receives an identification of at least one physical site for which the requesting users wants to collect metrics. The site identification may include an address, name, latitude/longitude values, or other identifier that distinguishes a particular location of a business. The system separate tracks each physical location of a business and may receive multiple site identifications that can be tracked so that metrics for the locations can be compared with each other and with competing locations.

Continuing in block 330, the system receives a selection of one or more sources to track for online activity related to the identified physical site. The system may receive a set of sources identified by the requesting user and/or may automatically determine one or more sources to monitor, based on configuration from an administrator, previously identified online sources, or other method. The system selects sources that are likely to capture a complete and useful impression of how well the business is performing at its offline locations based on activity between users of online sources.

Continuing in block 340, the system defines one or more benchmarks based upon which to monitor the selected sources for activity. The benchmarks may be received from the requesting user and specify particular data and/or inquiries that the user expects to be able to satisfy from the monitored sources. The benchmarks may include data directly available from sources as well as derivative data. In some cases, benchmarks are defined as comparisons between two data sets collected at different times, such as records for the same brand and location from today and the same day last year, today and yesterday, today and this day last month, and so forth.

Continuing in block 350, the system sets one or more triggers based on a threshold received from the requesting user that indicates at least one benchmark value for which the requesting user requests to be notified. A trigger specifies a point in the data beyond which the requesting user wants to be informed of changes in the data so that the user can react appropriately. For example, if online sentiment expressed towards a location becomes sharply negative in a short period, the requesting user may want to know. Likewise, if after a costly advertising campaign a location experiences a rapid increase in foot traffic or other metrics, the user may want to be notified. Triggers allow users of the system to set these points of interest.

Continuing in block 360, the system stores a monitoring definition that includes the received brand, physical location, sources, benchmarks, and triggers. The system stores this information in a data store accessed by processes for acquiring data from the sources, analyzing the data, and notifying requesting users of any satisfied trigger conditions. After block 360, these steps conclude.

The following figures illustrate example user interfaces produced by the business monitoring system, in one embodiment.

Figure 4:
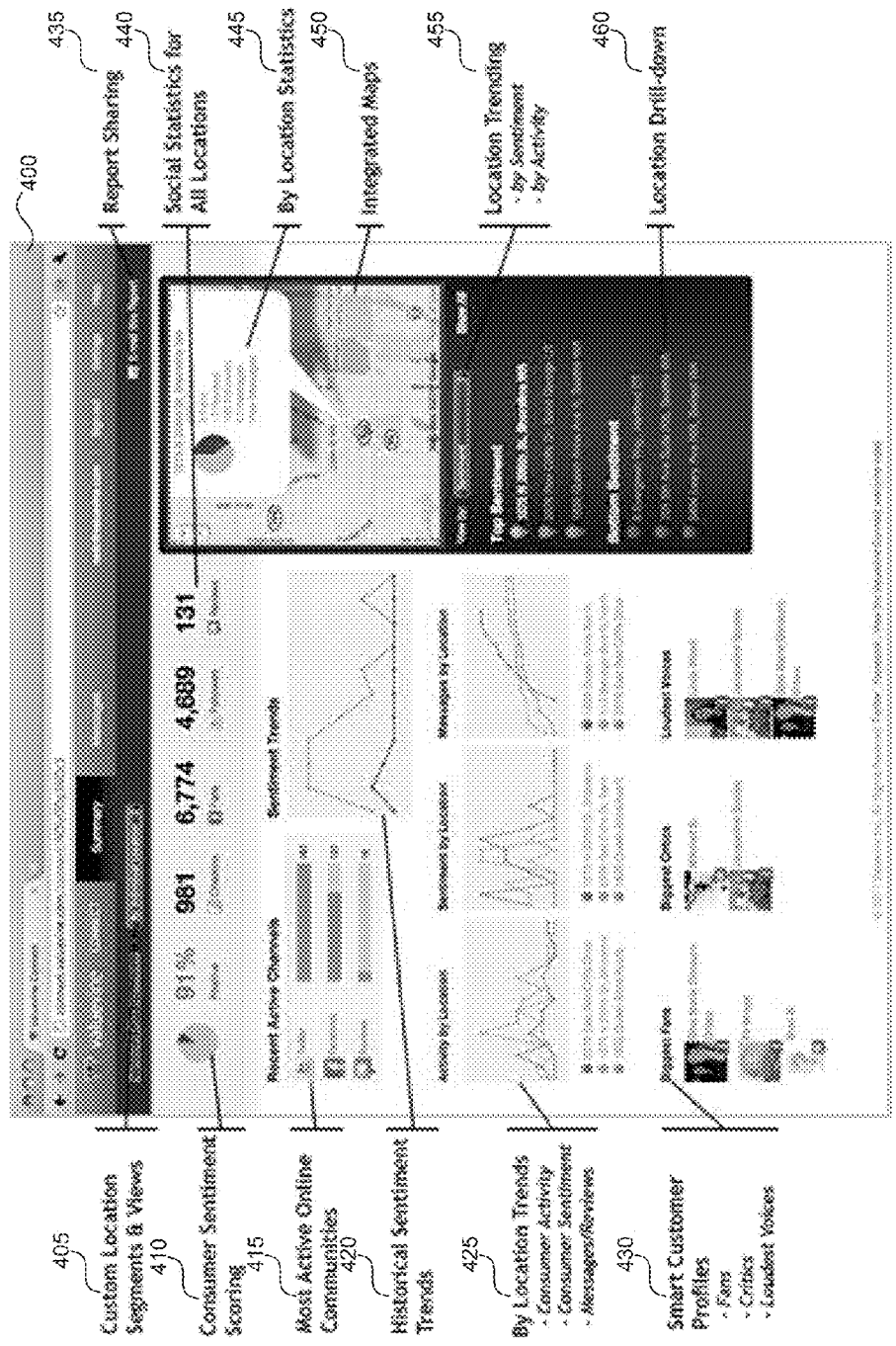
FIG. 4 is a display diagram that illustrates a metric reporting dashboard of the business monitoring system, in one embodiment.

FIG. 4 is a display diagram that illustrates a metric reporting dashboard of the business monitoring system, in one embodiment. The dashboard 400 includes various widgets that display to a user of the system collected metrics for a business. For example, there are widgets for showing custom location segments and views 405, consumer sentiment scoring 410, most active online communities 415, historical sentiment trends 420, by location trends 425, smart consumer profiles 430, report sharing settings 435, social statistics for all locations 440, by location statistics 445, integrated maps 450, location trending 455, and location drill down information 460. From each of these, the user can select and drill down to further understand or evaluate the underlying data.

Figure 5:
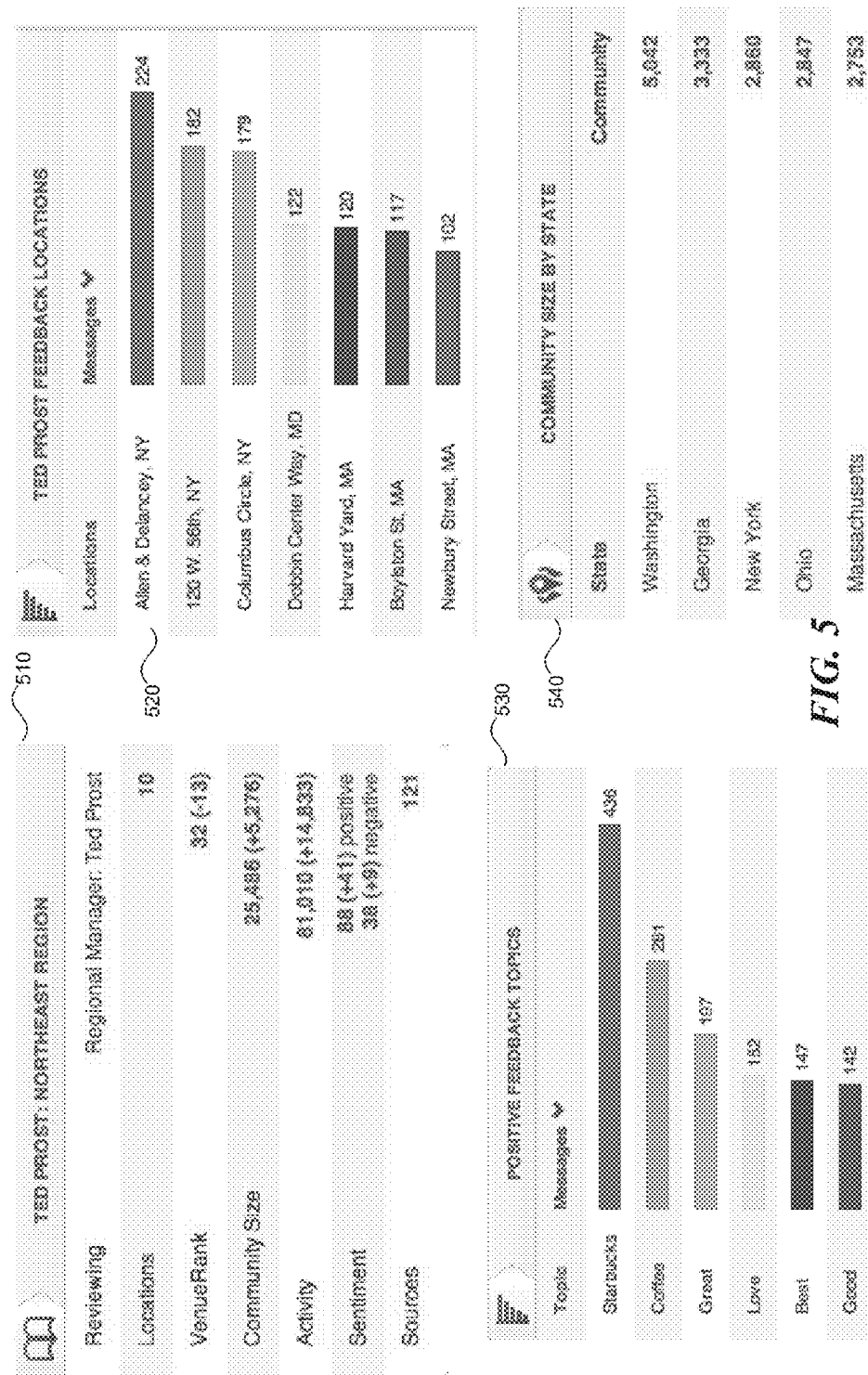
FIG. 5 is a display diagram that illustrates four widgets for displaying business metrics, in one embodiment.

FIG. 5 is a display diagram that illustrates four widgets for displaying business metrics, in one embodiment. The widgets may be displayed in a dashboard like that shown with reference to FIG. 4 or on separate detail pages. The diagram includes a first widget 510 that displays information to a regional manager for his entire region. The first widget 510 summarizes various statistics for the manager's region, such as community size and recent increase in that size. The second widget 520 displays locations monitored for the district manager, sorted by messages detected at various online sources. The manager can use this to see which locations are receiving the most online buzz or other activity. A third widget 530 shows the most common positive feedback topics for the monitored locations. A fourth widget 540 breaks the reported community size up by state.

Figure 6:
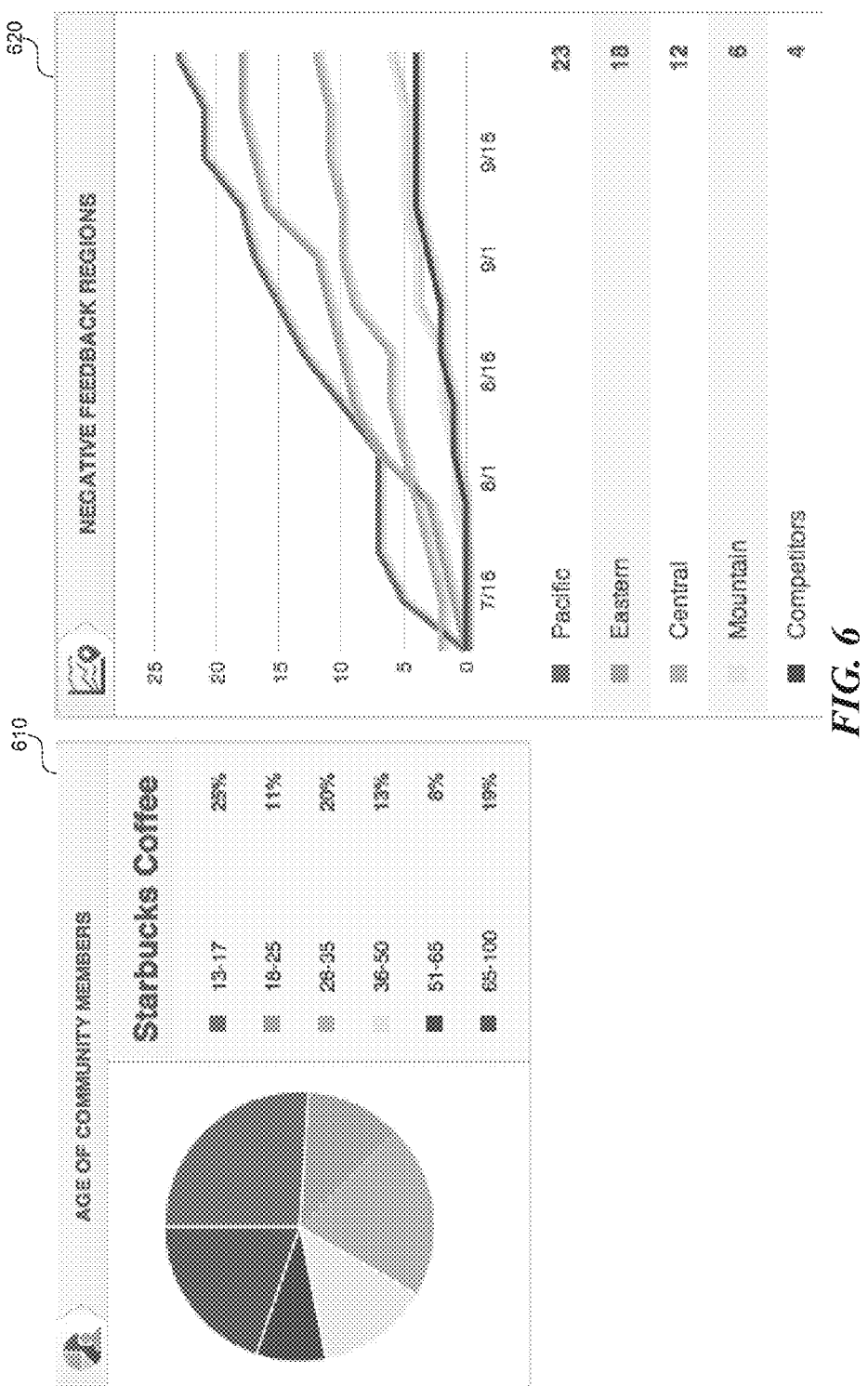
FIG. 6 is a display diagram that illustrates two more widgets for displaying business metrics, in one embodiment.

FIG. 6 is a display diagram that illustrates two more widgets for displaying business metrics, in one embodiment. The diagram includes a fifth widget 610 that displays ages of community members displayed as a pie graph. The system gathers this information when the online signals are acquired, from demographic data provided by a particular source, or inferred from other information. The diagram also includes a sixth widget 620 that displays regions that have received the most negative feedback. This may help a district manager or other executive to identify trouble spots so that action can be taken to address any problems.

Figure 7:
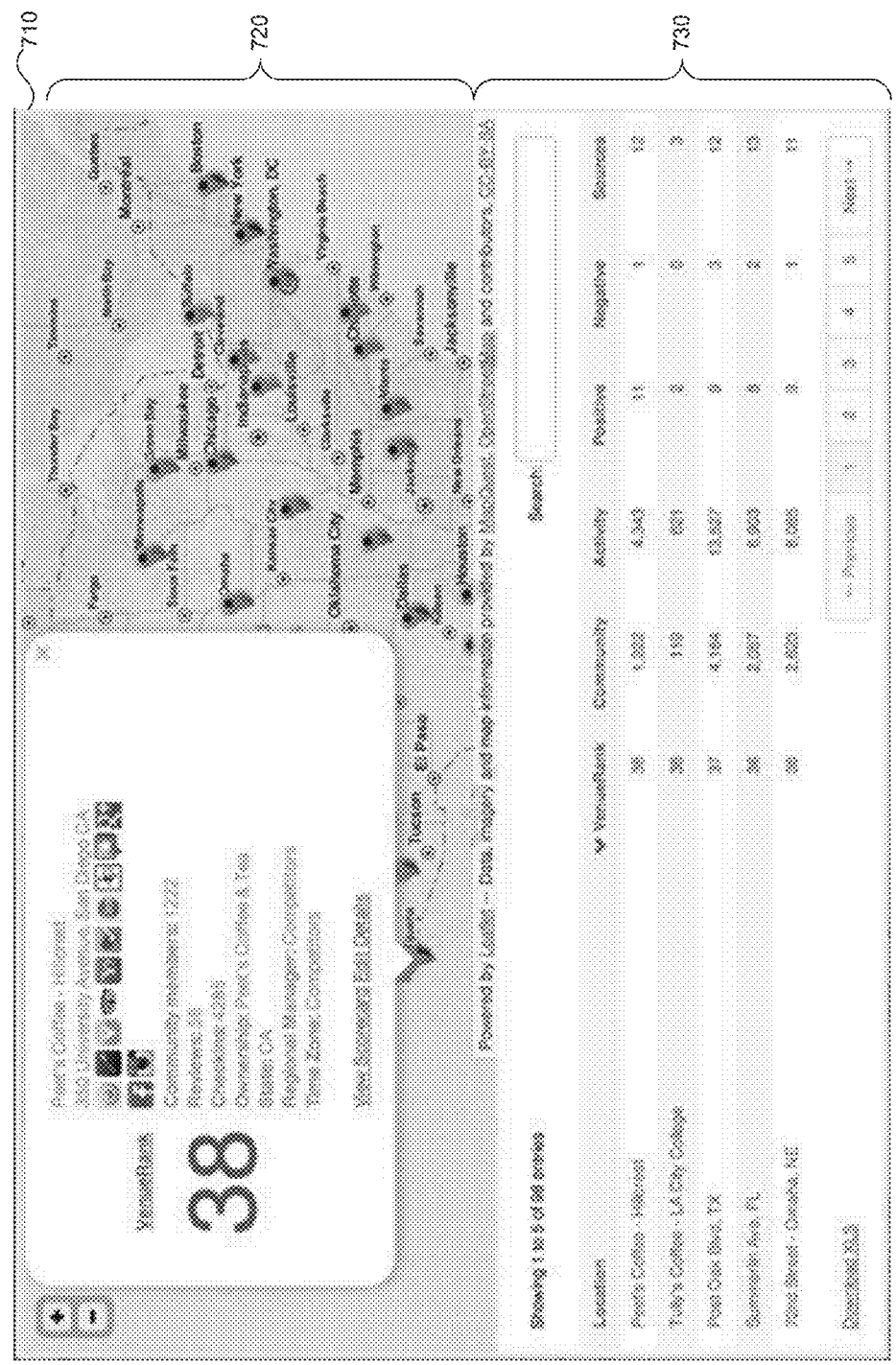
FIG. 7 is a display diagram that shows a map-based display of metrics, in one embodiment.

FIG. 7 is a display diagram that shows a map-based display of metrics, in one embodiment. The display 710 includes a map 720 followed by a list of locations 730 sorted by rank. In some embodiments, the business monitoring system calculates a VenueRank that factors in various acquired metrics such as consumer sentiment, community growth/size, activity/engagement, a factor of how easily a business can be found online, and potentially other information to arrive at a relative ranking between business locations. In some cases, the VenueRank is based on positive reviews and is time based so that older reviews roll off over time. The VenueRank thus reflects those business locations that are most highly regarded, and can be divided by various business segments, geographical regions, and so forth. By sorting the list of locations 730, a user can quickly identify those business locations that are highly regarded for the area displayed within the map 720.

From the foregoing, it will be appreciated that specific embodiments of the business monitoring system have been described herein for purposes of illustration, but that various modifications may be made without deviating from the spirit and scope of the invention. Accordingly, the invention is not limited except as by the appended claims.

We claim:

1. A computer-implemented method to build metrics by tracking online occurrences and inferring offline behavior from those occurrences, the method comprising:

receiving a monitoring request, wherein the monitoring request comprises brand information indicative of at least one brand for which to monitor online activity and location data indicative of at least one particular physical location of a multi-location brand for which to monitor online activity;

receiving a list of one or more online signal sources that provide online signal data, the online signal data comprising metadata indicative of at least time data, geographic location data, and consumer interaction data;
setting benchmark data, the benchmark data comprised of a consumer interaction metric by which to compare online signal data collected during a first time period and online signal data collected during a second time period,
wherein the consumer interaction metric is a ratio of (a) consumer interaction data correlated to the at least one particular location to (b) at least one of (i) consumer interaction data correlated to each location of the multi-location brand, (ii) consumer interaction data correlated to a second particular location, or (iii) consumer interaction data correlated to a set of particular locations of the multi-location brand;
setting a variance trigger, the variance trigger comprising (i) consumer interaction variance threshold data indicating a threshold variance associated with the consumer interaction metric, (ii) an indication defining the first time period and the second time period, and (iii) recipient device notification instructions for execution in an instance in which the threshold variance is satisfied;
for each online signal source in the received list:
acquiring any corresponding online signal data, and analyzing the corresponding online signal data to identify whether any corresponding geographic location data correlates to the at least one particular physical location of the multi-location business;
aggregating, on a periodic basis, according to any time data corresponding to the online signal data, the online signal data based on the geographic location data;
determining the benchmark data, utilizing the aggregated online signal data, by:
calculating a first consumer interaction metric,
wherein the first consumer interaction metric is the ratio, for the first time period, of (a) the consumer interaction data correlated to the at least one particular location to (b) at least one of (i) the consumer interaction data correlated to each location of the multi-location brand, (ii) consumer interaction data correlated to a second particular location, or (iii) consumer interaction data correlated to a set of particular locations of the multi-location brand;
calculating a second consumer interaction metric,
wherein the second consumer interaction metric is the ratio, for the second time period, of (a) the consumer interaction data correlated to the at least one particular location to (b) at least one of (i) the consumer interaction data correlated to each location of the multi-location brand, (ii) consumer interaction data correlated to a second particular location, or (iii) consumer interaction data correlated to a set of particular locations of the multi-location brand; and
comparing the first consumer interaction metric and second consumer interaction metric to detect a variance in the first consumer interaction metric and second consumer interaction metric,
detecting whether the benchmark data satisfies the threshold variance; and
upon detecting that the threshold variance is satisfied, executing the recipient device notification instructions.

2. The method of claim 1 wherein receiving the list of online signal sources comprises accessing the list of online signal sources from a data store where the online signal source list was stored after a brand owner configured the system to track metrics for the physical location and brand.

3. The method of claim 1 wherein receiving the list of online signal sources comprises receiving online signal sources that include a variety of online locations, specified by uniform resource locator (URL) or other identifier, where consumers of the physical location and brand congregate online and discuss the business represented by the physical location and brand.

4. The method of claim 1 wherein acquiring online signal data comprises accessing online information related to one or more users' opinions or experiences with respect to the physical location and brand.

5. The method of claim 1 wherein acquiring the online signal data comprises invoking programmatic application-programming interfaces (APIs) of each source for retrieving data.

6. The method of claim 1 wherein analyzing the online signal data comprises performing at least one of content analysis, semantic analysis, and demographic analysis to determine the content and nature of each acquired online signal data item.

7. The method of claim 1 wherein aggregating the online signal data comprises rolling up data from each online signal source to produce overall metrics for benchmarks that convey how people congregating online view an offline, physical business location.

8. The method of claim 1 wherein building benchmarks comprises determining comparable locations and segments to determine which historical data to compare.

9. The method of claim 1 wherein building benchmarks comprises performing comparisons between locations of the same brand.

10. The method of claim 1 wherein building benchmarks comprises performing comparisons between brands of similar types.

11. The method of claim 1 wherein building benchmarks comprises implicitly building benchmarks by identifying similar data across brands and locations and identifying past matching brands and locations as similar for comparison.

12. The method of claim 1 wherein detecting variances comprises detecting a deviation from an expected value for any tracked metrics, including both explicitly and implicitly defined variances.

13. The method of claim 1 wherein detecting variances comprises identifying a customer-defined trigger points at which a customer is to be notified for a data value variance.

14. A computer system for producing offline location-based consumer metrics using online signals, the system comprising:
an apparatus comprising at least one processor and at least one memory including computer program code, the at least one memory and the computer program code configured to, with the processor, cause the apparatus to at least:
receiving a monitoring request, wherein the monitoring request comprises brand information indicative of at least one brand for which to monitor online activity and location data indicative of at least one particular physical location of a multi-location brand for which to monitor online activity;
receiving a list of one or more online signal sources that provide online signal data, the online signal data comprising metadata indicative of at least time data, geographic location data, and consumer interaction data;
setting benchmark data, the benchmark data comprised of a consumer interaction metric by which to compare online signal data collected during a first time period and online signal data collected during a second time period, wherein the consumer interaction metric is a ratio of (a) consumer interaction data correlated to the at least one particular location to (b) at least one of (i) consumer interaction data correlated to each location of the multi-location brand, (ii) consumer interaction data correlated to a second particular location, or (iii) consumer interaction data correlated to a set of particular locations of the multi-location brand;

setting a variance trigger, the variance trigger comprising (i) consumer interaction variance threshold data indicating a threshold variance associated with the consumer interaction metric, (ii) an indication defining the first time period and the second time period, and (iii) recipient device notification instructions for execution in an instance in which the threshold variance is satisfied;

for each online signal source in the received list:
acquiring any corresponding online signal data, and
analyzing the corresponding online signal data to identify whether any corresponding geographic location data correlates to the at least one particular physical location of the multi-location business;

aggregating, on a periodic basis, according to any time data corresponding to the online signal data, the online signal data based on the geographic location data;

determining the benchmark data, utilizing the aggregated online signal data, by:
calculating a first consumer interaction metric,
wherein the first consumer interaction metric is the ratio, for the first time period, of (a) the consumer interaction data correlated to the at least one particular location to (b) at least one of (i) the consumer interaction data correlated to each location of the multi-location brand, (ii) consumer interaction data correlated to a second particular location, or (iii) consumer interaction data correlated to a set of particular locations of the multi-location brand;
calculating a second consumer interaction metric,
wherein the second consumer interaction metric is the ratio, for the second time period, of (a) the consumer interaction data correlated to the at least one particular location to (b) at least one of (i) the consumer interaction data correlated to each location of the multi-location brand, (ii) consumer interaction data correlated to a second particular location, or (iii) consumer interaction data correlated to a set of particular locations of the multi-location brand; and
comparing the first consumer interaction metric and second consumer interaction metric to detect a variance in the first consumer interaction metric and second consumer interaction metric, detecting whether the benchmark data satisfies the threshold variance; and upon detecting that the threshold variance is satisfied, executing the recipient device notification instructions.

15. The system of claim 14 wherein the apparatus further includes computer program code further configured to, with the processor, cause the apparatus to store a historical log of online signal data collected over time, so that comparisons can be made to detect relevant events and to suggest action changes or marketing improvements.

16. The system of claim 14 wherein the apparatus further includes computer program code further configured to, with the processor, cause the apparatus to store location data and provide a collection of geographic points, grouped together by brand data, representing the locations to be tracked.

17. The system of claim 14 wherein the apparatus further includes computer program code further configured to, with the processor, cause the apparatus to provide a user interface configured to provide a facility to define locations and online signal sources within the brand, specify triggers for alerting, and to query aggregate brand data interactively.

18. The system of claim 14 wherein the apparatus further includes computer program code further configured to, with the processor, cause the apparatus to provide access to content indexed in an inverted index system to expose a high performance query interface with faceting on at least one of location, source type, interaction type, sentiment, segment, and demographic data.

19. The system of claim 14 wherein the apparatus further includes computer program code further configured to, with the processor, cause the apparatus to utilize crowdsourcing for online signal source discovery to fill in gaps by discovering new online signal sources.

20. A non-transitory computer-readable storage medium comprising instructions for controlling a computer system to receive a request to monitor a brand's performance at a physical location of a multi-location business through online events, wherein the instructions, upon execution, cause a processor to perform actions comprising:

receiving a monitoring request, wherein the monitoring request comprises brand information indicative of at least one brand for which to monitor online activity and location data indicative of at least one particular physical location of a multi-location brand for which to monitor online activity;

receiving a list of one or more online signal sources that provide online signal data, the online signal data comprising metadata indicative of at least time data, geographic location data, and consumer interaction data;

setting benchmark data, the benchmark data comprised of a consumer interaction metric by which to compare online signal data collected during a first time period and online signal data collected during a second time period, wherein the consumer interaction metric is a ratio of (a) consumer interaction data correlated to the at least one particular location to (b) at least one of (i) consumer interaction data correlated to each location of the multi-location brand, (ii) consumer interaction data correlated to a second particular location, or (iii) consumer interaction data correlated to a set of particular locations of the multi-location brand;

setting a variance trigger, the variance trigger comprising (i) consumer interaction variance threshold data indicating a threshold variance associated with the consumer interaction metric, (ii) an indication defining the first time period and the second time period, and (iii) recipient device notification instructions for execution in an instance in which the threshold variance is satisfied;

for each online signal source in the received list:
acquiring any corresponding online signal data, and
analyzing the corresponding online signal data to identify whether any corresponding geographic location data correlates to the at least one particular physical location of the multi-location business;

aggregating, on a periodic basis, according to any time data corresponding to the online signal data, the online signal data based on the geographic location data;

determining the benchmark data, utilizing the aggregated online signal data, by:

calculating a first consumer interaction metric, wherein the first consumer interaction metric is the ratio, for the first time period, of (a) the consumer interaction data correlated to the at least one particular location to (b) at least one of (i) the consumer interaction data correlated to each location of the multi-location brand, (ii) consumer interaction data correlated to a second particular location, or (iii) consumer interaction data correlated to a set of particular locations of the multi-location brand;

calculating a second consumer interaction metric, wherein the second consumer interaction metric is the ratio, for the second time period, of (a) the consumer interaction data correlated to the at least one particular location to (b) at least one of (i) the consumer interaction data correlated to each location of the multi-location brand, (ii) consumer interaction data correlated to a second particular location, or (iii) consumer interaction data correlated to a set of particular locations of the multi-location brand; and comparing the first consumer interaction metric and second consumer interaction metric to detect a variance in the first consumer interaction metric and second consumer interaction metric, detecting whether the benchmark data satisfies the threshold variance; and upon detecting that the threshold variance is satisfied, executing the recipient device notification instructions.

* * * * *